United States Patent
Tohyama et al.

(10) Patent No.: US 6,882,446 B1
(45) Date of Patent: Apr. 19, 2005

(54) DATA COMMUNICATION APPARATUS

(75) Inventors: Daisetsu Tohyama, Toyokawa (JP);
Takayuki Nabeshima, Toyokawa (JP);
Katsuaki Tajima, Toyokawa (JP);
Toshio Tsuboi, Okazaki (JP); Junji Nishigaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 798 days.

(21) Appl. No.: 09/666,132

(22) Filed: Sep. 20, 2000

(30) Foreign Application Priority Data

Sep. 21, 1999 (JP) .......................................... 11-266561

(51) Int. Cl.⁷ .............................................. G06K 15/00
(52) U.S. Cl. ...................... 358/1.9; 358/1.15; 382/167; 382/162
(58) Field of Search ............................. 358/1.15, 1.16, 358/400, 401, 1.14, 1.13, 1.6, 1.9, 500, 504, 518, 520, 2.1, 7.1, 3.01, 1.18; 379/100.01, 100.05, 100.15, 102.03

(56) References Cited

U.S. PATENT DOCUMENTS 5,027,221 A * 6/1991 Hisatake et al. ............ 358/300
5,898,504 A * 4/1999 Okada et al. ................ 358/500
6,343,146 B1 * 1/2002 Tsuruoka et al. ........... 382/163

FOREIGN PATENT DOCUMENTS

| JP | 7-287560 | | 10/1995 | |
| JP | 8009172 | * | 1/1996 | ............ H04N/1/60 |
| JP | 10-98599 | | 4/1998 | |
| JP | 11-69126 | | 3/1999 | |
| JP | 20001309031 | * | 4/2000 | ............ H04M/1/82 |
| JP | 2000-350231 | * | 12/2000 | ............ H04N/9/64 |
| JP | 2000215384 | * | 1/2002 | ............ H04N/1/46 |

* cited by examiner

Primary Examiner—Jerome Grant, II
(74) Attorney, Agent, or Firm—McDermott Will & Emery LLP (57) ABSTRACT

A data communication apparatus and method are provided in which a faithful color reproduction is enabled in the reception side. The data communication apparatus comprises a first communication portion for a first form of image data communication, a second communication portion for a second form of image data communication and a transmission controller for selecting one of the first form and the second form in accordance with information indicating a color reproduction range of image output in the other end. The image data are transmitted to the other end by the first or the second communication portion corresponding to the selected form.

5 Claims, 9 Drawing Sheets

DATA COMMUNICATION APPARATUS

This application is based on Japanese Patent Application No. 266561/1999 filed on Sep. 21, 1999, the contents of which are incorporated herein by reference.

BACKGROUND OF THE INVENTION

1. Field of the Invention

The present invention relates to a data communication apparatus for transmitting a color image.

2. Description of the Prior Art

A facsimile machine is used widely for transmitting an image, and a facsimile communication of a color image is already realized. Usually, a facsimile machine of the reception side prints out a received image promptly. This immediacy enhances the value of the facsimile communication.

There is another transmission form such as E-mail communication in a LAN or the Internet. A receiver can open E-mail at any time, and an image that was received as an attached file can be displayed on a screen or can be printed out. The E-mail communication is useful when concealment and reliability are important.

Conventionally, a communication apparatus is proposed in which the facsimile communication and the E-mail communication are used selectively automatically. Japanese unexamined patent publication No. 11-69126 discloses a communication apparatus that memorizes registration information that indicates whether the image transmission by the E-mail communication is permitted or not for each party and transmits the image by the facsimile communication to the party to which the image transmission by E-mail communication is not permitted while sending a notify of the image transmission by E-mail to the party.

In data communication of a color image, there are some problems. If the color reproduction range of the image output in the reception side is narrower than the color range of the transmission data (the original image), some of colors may be outputted in different colors, or a color balance of the entire image may be lost. Especially, this problem is serious in the communication whose main purpose is to transmit color information (for example, a response to a question about a color of merchandise).

Since the reproduction range of the print is usually narrower than that of the color screen display, a conspicuous color shift can be generated easily between the original image and the print image when printing out in the reception side. There is a countermeasure for the problem of the color balance, i.e., a color compression process can be used for narrowing the color range of the original image to the color reproduction range. However, even if the color compression is performed, the color of the original image cannot be reproduced faithfully. In order to reproduce the color of the original image faithfully, the original image may be transmitted as an attached file of E-mail to the party. However, because of a familiar usage or a high immediacy, there is a tendency to prefer the facsimile transmission for transmitting image data. Conventionally, the facsimile communication cannot improve the above-mentioned color shift. If a user has to set a transmission form at every transmission, it causes a bad usability as well as losing the immediacy as the E-mail transmission is used when the facsimile communication can be used without any problem.

SUMMARY OF THE INVENTION

The object of the present invention is to provide a data communication apparatus that can reproduce a color of an image faithfully in a reception side along with a high immediacy and a good usability.

A data communication apparatus according to a first aspect of the present invention comprises a first communication portion for a first form of image data communication, a second communication portion for a second form of image data communication, and a transmission controller for selecting one of the first form and the second form in accordance with information indicating a color reproduction range of image output in the other end, wherein the image data are transmitted to the other end by the first or the second communication portion corresponding to the selected form.

A data communication apparatus according to a second aspect of the present invention comprises a communication portion for receiving image data, a memory for memorizing received image data, a printer for printing the received image data, and a reception controller for deciding whether the image data are to be printed or to be memorized without being printed in accordance with the color range of the received image data.

A data communication method according to a third aspect of the present invention comprises a transmission control step of selecting one of a first form and a second form, which is different from the first form, in accordance with information indicating a color reproduction range of image output in the other end and a communication step of transmitting image data to the other end in the first or second form selected by the transmission control step.

A data communication method according to a fourth aspect of the present invention comprises a reception step of receiving the image data, a reception controlling step of deciding whether the image data are to be printed or not to be printed in accordance with a color range of the received image data, a memorizing step of memorizing the received image data without printing when it is decided by the reception controlling step that the received image data are not to be printed, and a printing step of printing the received image data when it is decided by the reception step that the image data are to be printed.

DESCRIPTION OF THE PREFERRED EMBODIMENTS

Hereinafter, the present invention will be explained more in detail with reference to embodiments and drawings.

Figure 1:
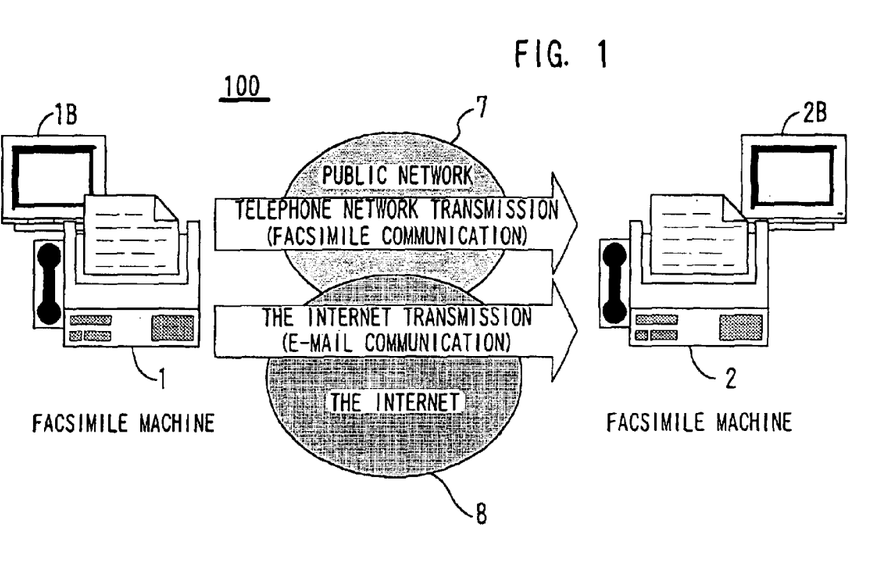
FIG. 1 shows a configuration of a data communication system according to the present invention.

FIG. 1 shows a configuration of a data communication system according to the present invention.

The data communication system 100 comprises at least two facsimile machines 1 and 2, a public network 7 for telephone communication and the Internet 8. The facsimile machine 1 includes a monitor 1B as a screen display means.

In the same way, the facsimile machine 2 includes a monitor 2B. These facsimile machines 1 and 2 can transmit and receive color image data. However, in FIG. 1, the facsimile machine 1 represents a data communication apparatus of the transmission side, while the facsimile machine 2 represents a data communication apparatus of the reception side. The data communication system 100 can select the facsimile communication using the public network 7 or the E-mail communication using the public network 7 and the Internet 8. These two kinds of communication forms can be used selectively in accordance with the color range of the image data that are the object of the communication.

Figure 2:
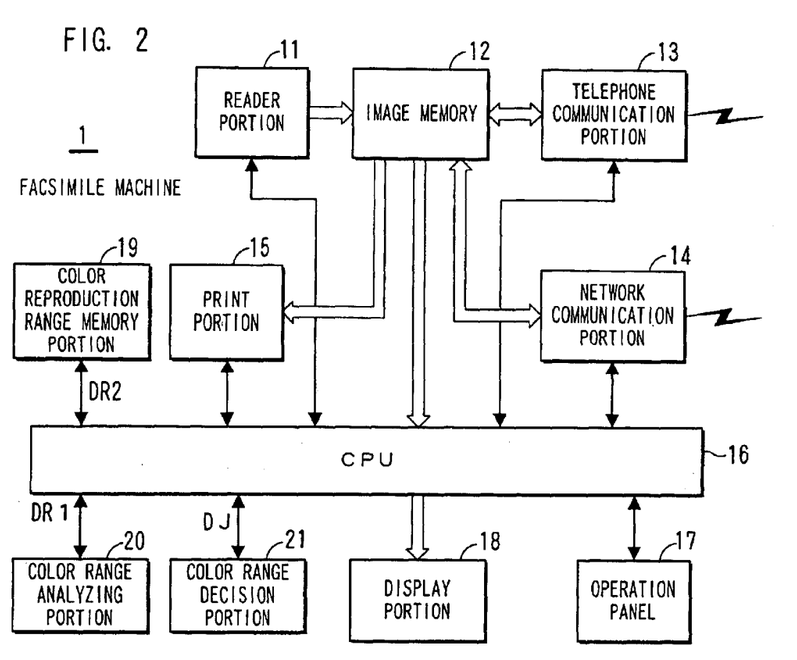
FIG. 2 is a block diagram showing a functional configuration of the facsimile machine.

FIG. 2 is a block diagram showing a functional configuration of the facsimile machine. Since the facsimile machines 1 and 2 have similar configurations, the facsimile machine 1 is used as an example for the following explanation.

The facsimile machine 1 includes basic elements for communication operation, which are a reader portion 11 for generating data of an image of an original document, an image memory 12 for temporarily memorizing the image data, a telephone communication portion 13 for the facsimile communication, a network communication portion 14 for the E-mail communication, a print portion 15 for printing, a CPU 16 as a controller, an operation panel 17 and a display portion 18 for screen display. The above-mentioned monitor 1B is an element of the display portion 18. In the transmission, the image data are sent from the reader portion 11 via the image memory 12 as a buffer to the telephone communication portion 13 or the network communication portion 14. In the reception, the image data are sent from the telephone communication portion 13 or the network communication portion 14 to the image memory 12. In the case of the facsimile communication, the image data are sent promptly from the image memory 12 to the print portion 15 for printing. In the case of the E-mail communication, the image data are memorized by the image memory 12 until the user instructs the print or the display operation. When the print operation is instructed, the image data are transferred from the image memory 12 to the print portion 15 for printing. When the display operation is instructed, the image data are transferred from the image memory 12 to the display portion 18 and are displayed by the monitor 1B. The color reproduction range of the display is wider than that of the printout.

Adding to the basic elements, the facsimile machine 1 includes other elements for selecting the communication form, which are a color reproduction range memory portion 19, a transmission color range analyzing portion 20 and a color range decision portion 21.

The color reproduction range memory portion 19 memorizes data DR2 indicating the color reproduction range of the image output in the other side for each registered party. The data DR2 can be obtained by some ways such as inputting a code for registration by the user or asking automatically to the apparatus of the other side for each communication. When the asking method is used, the color reproduction range memory portion 19 also memorizes the color reproduction range of the print portion 15 for answering the question from the other side. The memorized contents can be fixed data or variable data that can be corrected in accordance with detection of the print state as required.

The transmission color range analyzing portion 20 outputs data DR1 indicating the color range of the image data that are the object of the transmission. The data DR1 can be obtained by some ways such as an input operation by the user after deciding which one of the color reproduction ranges that are classified in advance the original corresponds to, or analyzing the image data automatically for each communication. If the original includes plural sheets, it is desirable to integrate all sheets of original to decide the color range.

The color range decision portion 21 compares the data DR1 and the data DR2 for transmission and outputs the data DJ indicating the inclusion relation between the color range of the image data to be transmitted and the color reproduction range of the other side. In accordance with the data DJ, the CPU 16 selects the communication form.

If the color range is included in the color reproduction range, the CPU 16 selects the facsimile communication and instructs the telephone communication portion 13 to send out the data. If the color range is not included in the color reproduction range, the CPU 16 instructs the operation panel 17 to display a message of selecting the E-mail communication. After that, when a user acknowledges the selection, the CPU 16 instructs the network communication portion 14 to send out the data. If the user does not acknowledge the selection, the facsimile communication is selected so that the telephone communication portion 13 is instructed to send out the data.

Figure 3:
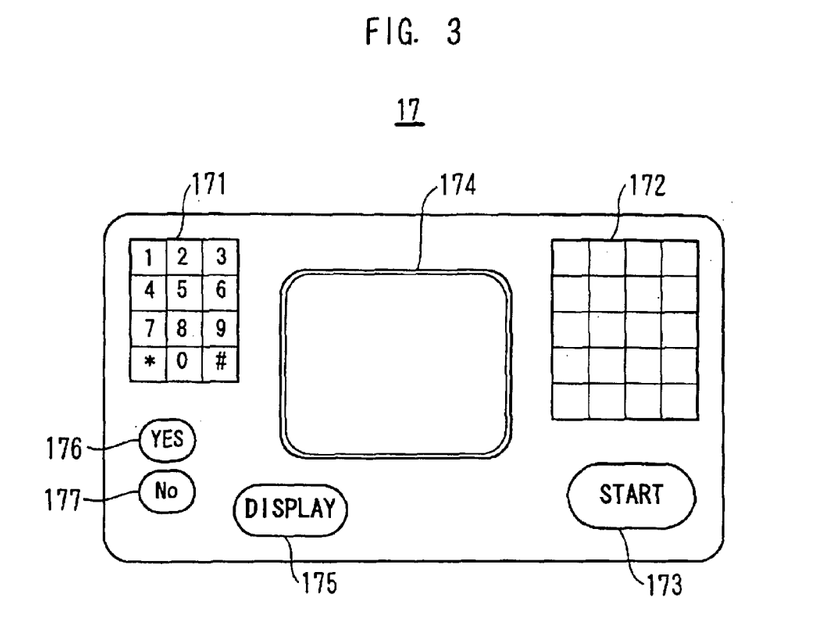
FIG. 3 shows a layout of the operation panel.
Figure 4:
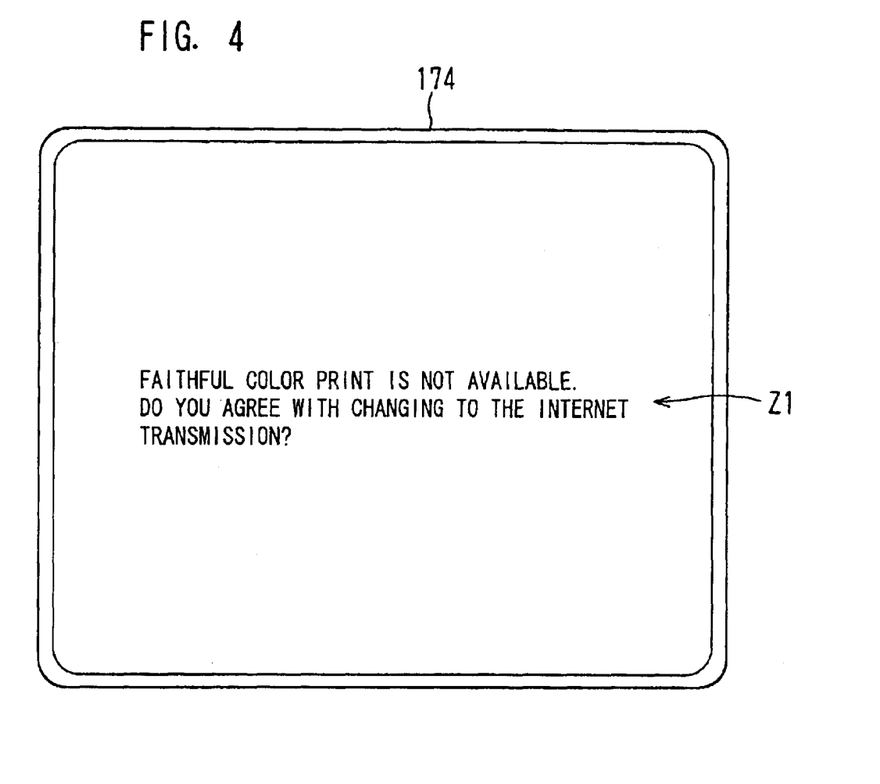
FIG. 4 shows an example of the message display.

FIG. 3 shows a layout of the operation panel. FIG. 4 shows an example of the message display.

The operation panel 17 includes a ten-key 171 for setting a dialing, parties and others, a group of keys 172 for selecting a party, a start key 173, a liquid crystal display 174, a display instruction key 175 and decision input keys 176 and 177. The liquid crystal display 174 displays a variety of guidance. In the above-mentioned case where the color range is out of the color reproduction range, the liquid crystal display 174 displays a message Z1 as shown in FIG. 4. Responding to this message, the user may push one of the decision input keys 176 and 177.

Hereinafter, the operation of the facsimile machine 1 will be explained with reference to a flowchart.

Figure 5:
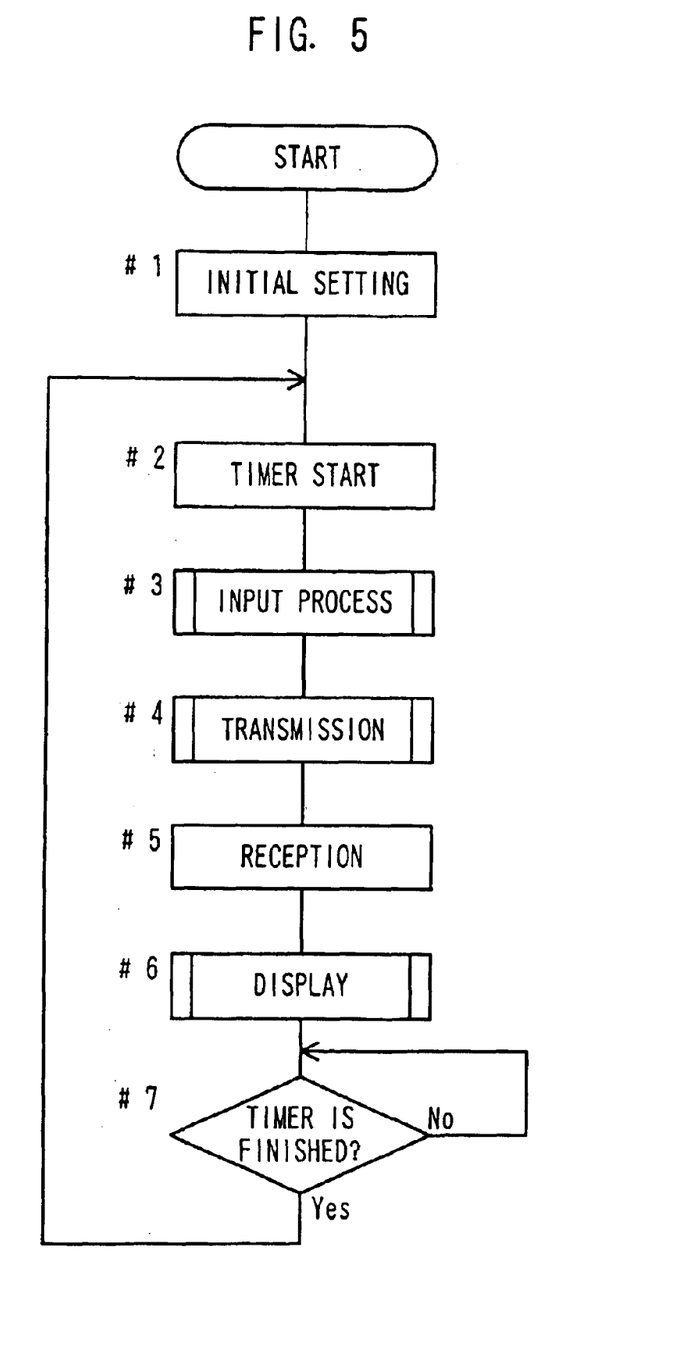
FIG. 5 is a main flowchart showing a general operation of the facsimile machine.

FIG. 5 is a main flowchart showing a general operation of the facsimile machine.

The CPU 16, after finishing an initial setting (#1) when the power is turned on, starts a timer that restricts a period of one routine (#2) and performs an input process (#3), a transmission control (#4), a reception control (#5) and a display control (#6) sequentially. After that, when the timer finishes (#7), the process goes back to step #2. While the power is on, the process from step #2 through step #7 is repeated.

Figure 6:
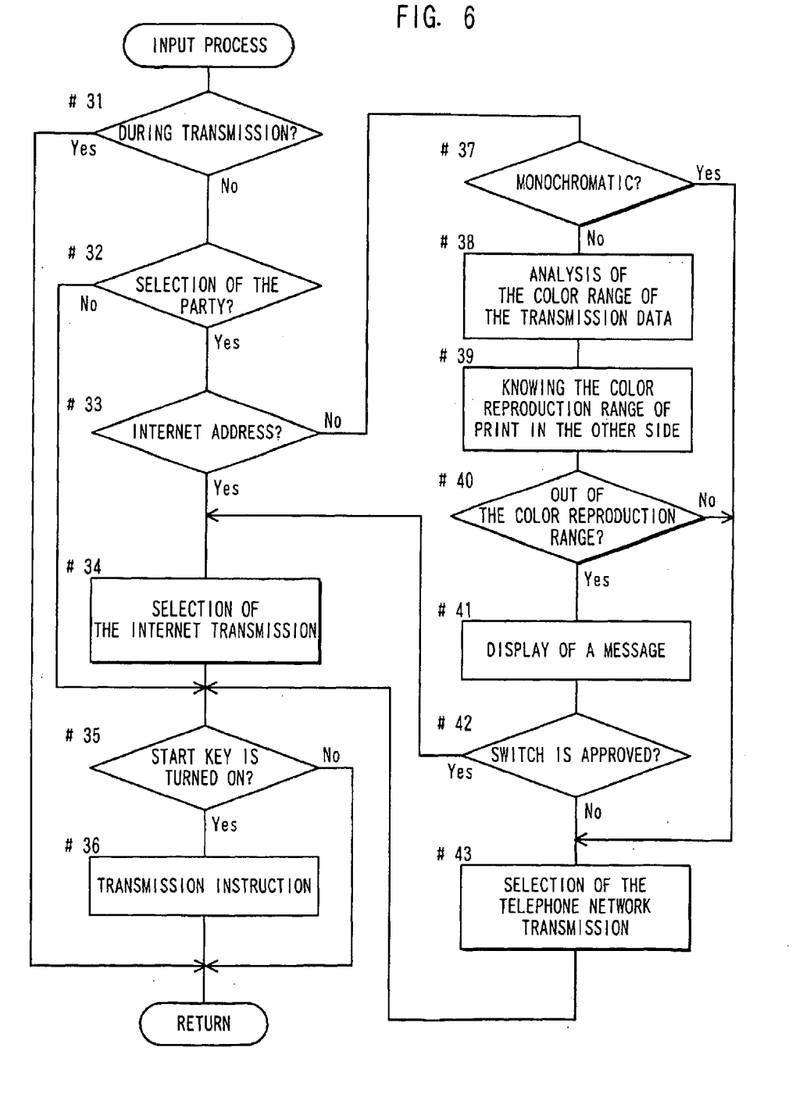
FIG. 6 is a flowchart of the input process subroutine.

FIG. 6 is a flowchart of the input process subroutine.

If it is in the transmission process, the process is maintained, and the routine goes to return (#31). After assigning a party, if the address is an Internet address, the Internet transmission (E-mail communication) is selected (#32–#34). Then, a transmission instructing flag is set corresponding to that the start key 173 is turned on (#35, #36).

If the address of the assigned party is not an Internet address, i.e., if the address is a telephone number and the facsimile communication is assigned (#33), it is checked whether the transmission image data are monochromatic data or not (#37). If the transmission image data are monochromatic data, the telephone network transmission (the facsimile communication) is selected (#43). It is because that the problem of the color reproduction does not occur. In contrast, if the transmission image data are color data, the color range of the transmission image data is analyzed so as to obtain the data DR1 (#38), and the data DR2 are obtained so that the color reproduction range of print in the other side can be known (#39). Then, if the color range is out of the color reproduction range, a message as shown in FIG. 4 is displayed (#40, #41). When the decision input key (YES key) 176 is turned on, the Internet transmission is selected (#42, #34). Thus, the party at the other side can select the print or the screen display that is superior to the print in the color reproducibility. If the decision input key (NO key) 177 is turned on, the telephone network transmission is selected since the Internet transmission is not acknowledged by the user (#43). In this way, after selecting the Internet transmission or the telephone network transmission, the process goes to step #35 for verifying the start instruction.

Figure 7:
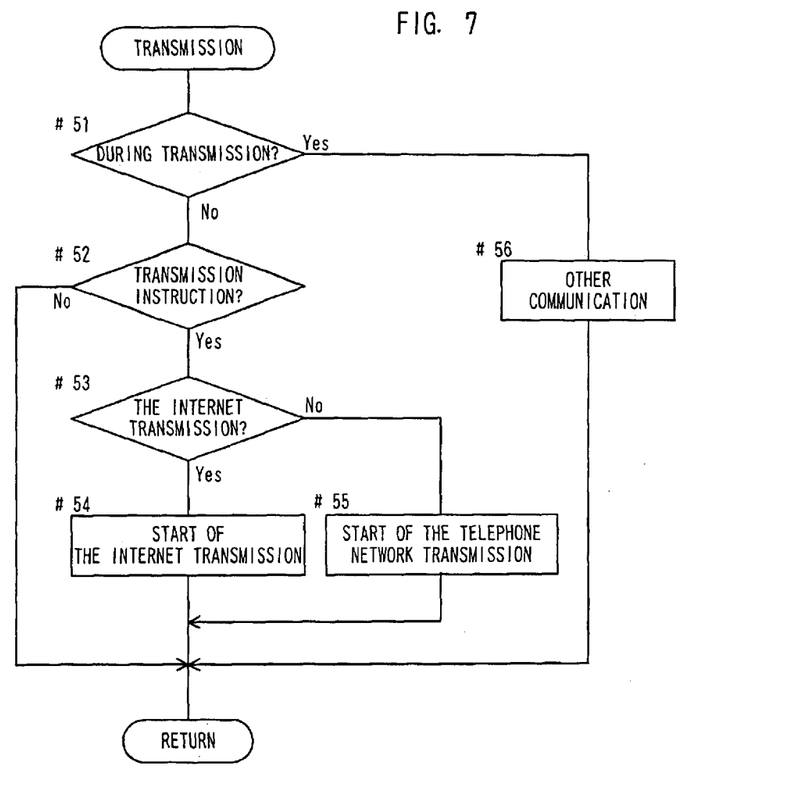
FIG. 7 is a flowchart of the transmission subroutine.

FIG. 7 is a flowchart of the transmission subroutine.

If it is in the transmission process, other communication processes are performed for continuing the transmission (#51, #56). If it is not in the transmission process and if the transmission instruction flag is set, the Internet transmission or the telephone network transmission is started in accordance with the selection of the communication form in the input process (#51–#55).

Figure 8:
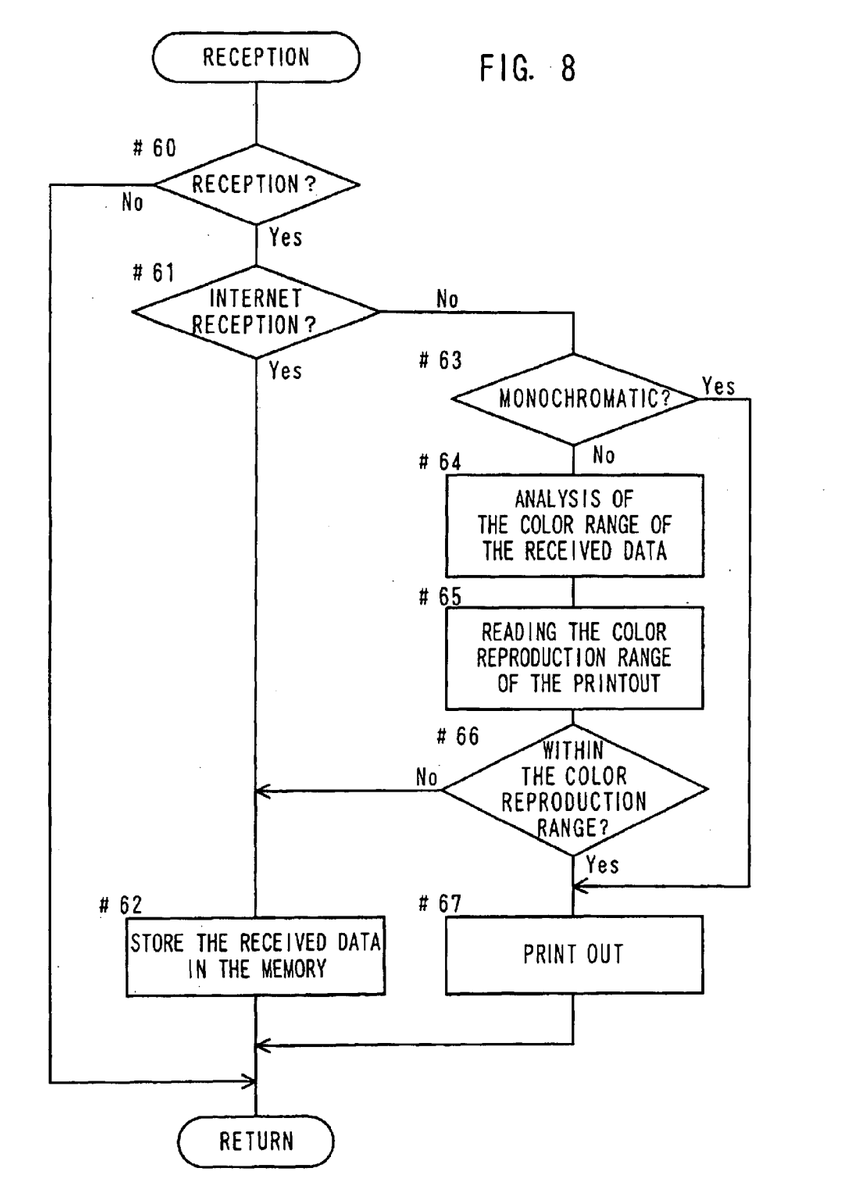
FIG. 8 is a flowchart of the reception subroutine.

FIG. 8 is a flowchart of the reception subroutine.

If the communication mode is not a reception one, the routine goes to return (#60). When the latest reception is made through the Internet, the received data are stored in the memory (#61, #62). When the latest reception is made by a facsimile communication, it is checked whether the received data are monochromatic data (#63). If the received data are monochromatic data, the received data are printed out (#67) because the problem of the color reproduction does not occur. In contrast, when the received data are color data, the color range of the received data is analyzed and the color reproduction range of the printout is read out of the color reproduction range memory portion 19 (#64, #65). If the color range of the received data is included in the color reproduction range of the printout, the received data are printed out (#66, #67). If it is not included in the color reproduction range of the printout, the received data are stored in the memory without being printed out (#66, #62) because the problem of the color reproduction occurs.

Figure 9:
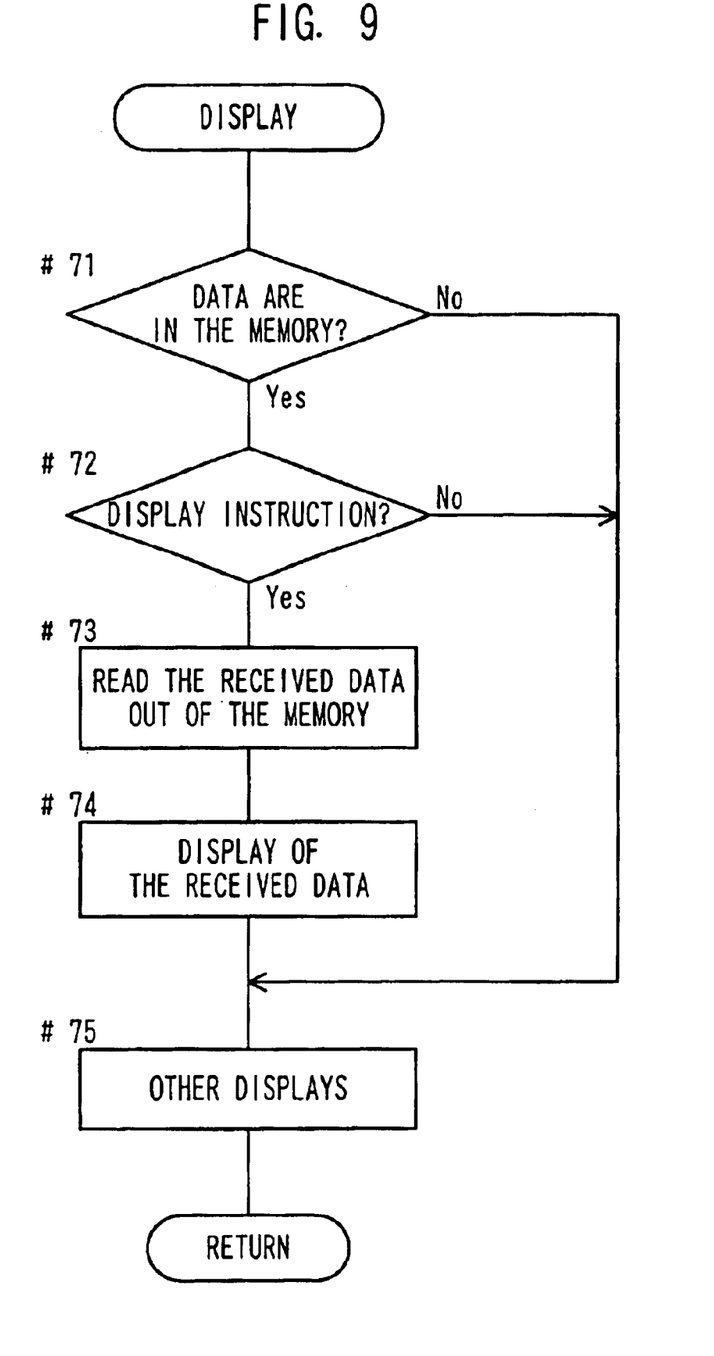
FIG. 9 is a flowchart of the display subroutine.

FIG. 9 is a flowchart of the display subroutine.

If the image data received in the E-mail communication are memorized in the image memory 12, the image data are read out of the image memory 12 responding to the turn-on of the display instruction key 175 and are transferred to the display portion 18, so that the image data are displayed on the screen (#71–#74). Then, other display processes are performed for controlling the liquid crystal display of the operation panel 17 (#75).

According to the above-mentioned embodiment, the user is not required to set the transmission method at every transmission, resulting in a good usability. It does not occur that the user selects the E-mail transmission that causes a loss of immediacy when the facsimile communication can print without any problem.

According to the above-mentioned embodiment, a faithful color reproduction in the reception side can be realized without losing the immediacy or the usability.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A data communication apparatus, which transmits image data to the other end, comprising:

a first communication portion for a first form of image data communication;

a second communication portion for a second form of image data communication; and a transmission controller for selecting one of the first form and the second form in accordance with information indicating a color reproduction range of image output in the other end, wherein the image data are transmitted to the other end by the first or the second communication portion corresponding to the selected form, wherein the transmission controller decides the inclusion relation between the color range of the image data and the color reproduction range and selects one of the first and the second communication portions.

2. The data communication apparatus according to claim 1, wherein the first form is facsimile communication, the second form is E-mail communication, and the transmission controller selects the facsimile communication if the color range is within the color reproduction range, and otherwise selects the E-mail communication.

3. The data communication apparatus according to claim 1, wherein the transmission controller selects the facsimile communication without deciding the inclusion relation if the image data are monochromatic data.

4. A data communication method for transmitting image data from one end to the other end, the method comprising:

a transmission control step of selecting one of a first form and a second form, which is different from the first form, in accordance with information indicating a color reproduction range of image output in the other end; and a communication step of transmitting Image data to the other end in the first or second form selected by the transmission control step, wherein the transmission control step includes the step of deciding the inclusion relation between the color range of the image data and the color reproduction range and selecting one of the first and the second communication steps.

5. The data communication method according to claim 4, wherein the first form is facsimile communication, the second form is E-mail communication, and the transmission control step includes the step of selecting the facsimile communication if the color range is within the color reproduction range, and otherwise selecting the E-mail communication.

* * * * *